INVENTOR.
ROBERT F. SHAW
BY S.C. Yuter
ATTORNEY.

INVENTOR.
ROBERT F. SHAW

Oct. 27, 1959 R. F. SHAW 2,910,668
INFORMATION PROCESSING SYSTEM
Filed March 3, 1954 6 Sheets—Sheet 4

GATE 68

BUFFER 92

DELAY LINE 116

INVENTOR.
ROBERT F. SHAW
BY S.C. Yuter
ATTORNEY

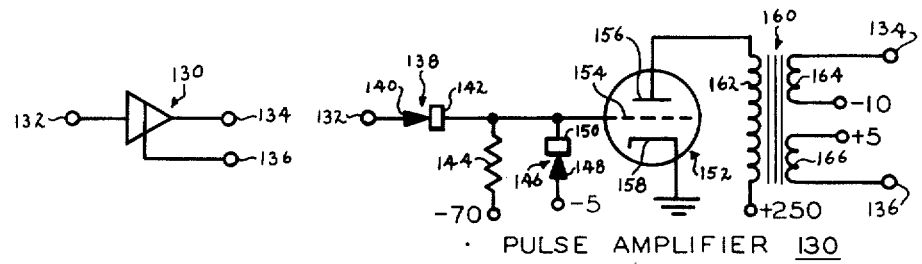
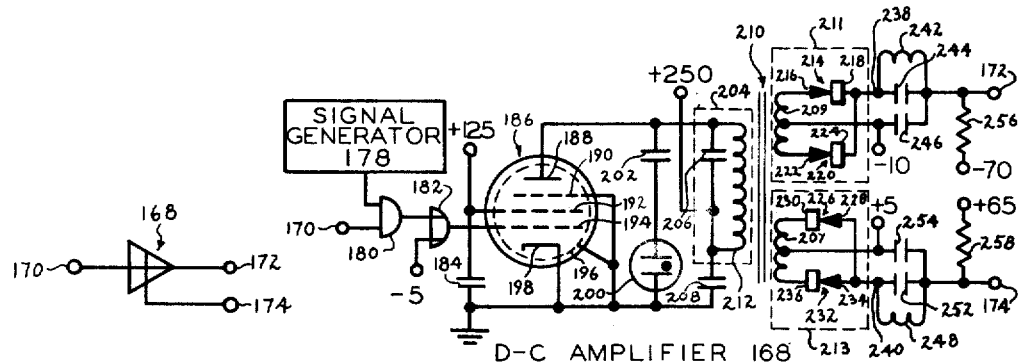
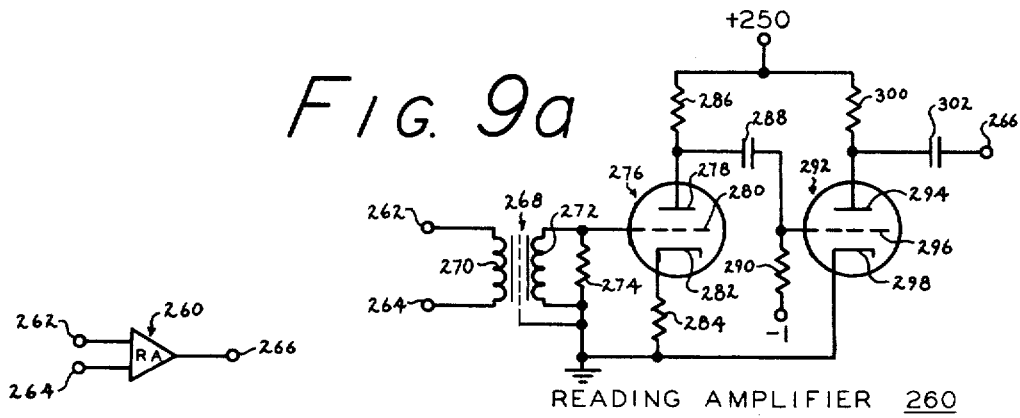

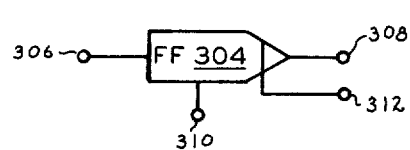
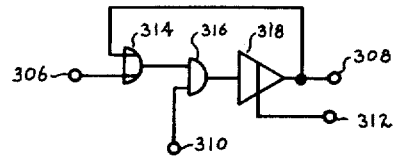
RESET DOMINANT FLIP-FLOP
304
Fig. 10    Fig. 10a
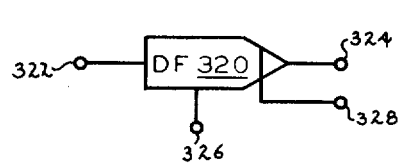
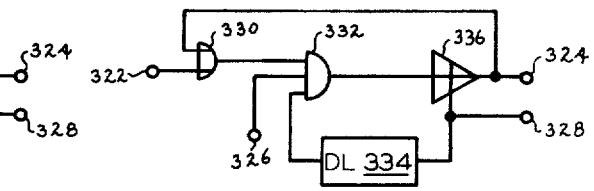
DELAY FLOP 320
Fig. 11    Fig. 11a
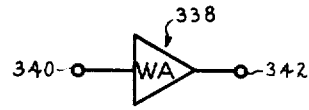
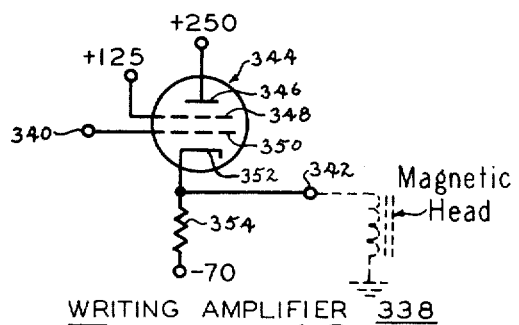
WRITING AMPLIFIER 338
Fig. 12    Fig. 12a
INVENTOR.
ROBERT F. SHAW
ATTORNEY United States Patent Office 2,910,668
Patented Oct. 27, 1959

2,910,668
INFORMATION PROCESSING SYSTEM

Robert F. Shaw, New York, N.Y., assignor to Underwood Corporation, New York, N.Y., a corporation of Delaware Application March 3, 1954, Serial No. 413,746

3 Claims. (Cl. 340—174)

This invention relates to information processing systems, and more particularly to a method of and means for storing and reproducing coded information.

In formation processors usually operate with information expressed as coded numbers. Thus, an information item representing a numerical digit, a letter of the alphabet or a symbol may be expressed as a number in the binary system of notation.

In the binary system of notation, information is represented by a number using the following formula:

$$I = A_n(2^n) + A_n - 1(2^{n-1}) + \ldots A_1(2^1) + A_0(2^0)$$

in which the constants $A_n$, $A_{n-1}$, ... $A_0$ are integral coefficients represented by 0 or 1. Thus, in a six digit binary system of notation the decimal digit 9 which can be written, according to the formula, as:

$$9 = 0(2^5) + 0(2^4) + 1(2^3) + 0(2^2) + 0(2^1) + 1(2^0)$$

or $$9 = 0 + 0 + 8 + 0 + 0 + 1$$

is written in terms of the coefficients of the powers of two, that is, as: 001001. Therefore, binary coded decimal digits are composed of a combination of the binary digits or bits 0 and 1.

Thus, the first ten decimal digits can be written according to the six digit binary system of notation as shown in the following table:

```
0 = 000000    5 = 000101
1 = 000001    6 = 000110
2 = 000010    7 = 000111
3 = 000011    8 = 001000
4 = 000100    9 = 001001
```

Likewise, the alphabet and the symbols may be expressed by other combinations of the six digit binary code as for example:

$$C = 010010 \quad \Sigma = 001101$$

The binary system of notation is well suited to information processors since many of the basic circuits of an information processor assume two stable states. These states may be expressed by the presence or absence of a particular indicium; for example, the presence or absence of given magnetic polarization, the presence or absence of a perforation or other visible indication, or the presence or absence of an electrical signal.

In information processors it is desirable to store certain information for various periods of time and yet have the information readily available for reading or alteration. Information storage media such as magnetic tapes and perforated tapes have been widely used in information processors for purposes of storing coded information in the form of magnetized spots or perforations.

The storage medium is often theoretically divided into a plurality of longitudinal channels or tracks corresponding in number to the number of bits in the code being used (as for example a six digit binary code requires six channels), and also into a multitude of storage zones each of which extends laterally across the storage medium. Each storage zone is composed of a plurality of adjacent storage positions, one for each channel, in each of which is stored a bit of information expressed as the presence or absence of a given magnetic polarization or the presence or absence of a perforation.

Further, the storage medium may be divided into longitudinal blocks of information each of which is composed of a predetermined number of storage zones which may be completely or partially filled with information items. The blocks of information are separated by a number of storage zones having no information items stored therein.

In operation, the storage medium functions, generally, to store series of blocks of information. In view of the fact that there may be a number of storage zones (in the blocks of information and in the space between blocks) containing no information, a problem often arises in distinguishing the presence of information from the absence of information and more particularly, distinguishing between the presence of a coded number containing only zeros, on the one hand, and the absence of information, on the other, during the transfer of information from the storage medium to the information processor. A failure to distinguish between zeros and the absence of information may lead to serious errors in the operation of the information processor.

Accordingly, it is an object of the present invention to process information such that it may be distinguished from the absence of information.

Another object of the invention is to process numerical information such that zeros may be distinguished from the absence of information.

The invention will be described in connection with a storage tape having a multitude of storage zones each of which is composed of a plurality of storage positions corresponding in number to the number of bits of information in each information item. The preferred method of storing and reproducing information items comprises the steps of storing a portion of the bits of each information item in corresponding storage positions of a storage zone in accordance with a predetermined representation in which a bit one is represented by the presence of indicia in a storage position while a bit zero is represented by the absence of indicia in a storage position, storing the remaining portion of the bits of each information item in the remaining storage positions of the storage zone in accordance with a representation which is inverse to that of the predetermined representation such that the presence of indicia in any storage position of a storage zone indicates the presence of an information item in that storage zone while the absence of indicia in any storage position of a storage zone indicates the absence of an information item in that storage zone, reproducing the first mentioned portion of each stored information item according to the predetermined representation, and reproducing the remaining portion of each stored information item according to the inverse representation.

Storage media have been used in which an additional channel of the medium has indicia stored therein for indicating the presence or absence of an information item while the remaining channels are used for information storage. Thus, a six digit binary code would require a storage medium having seven channels.

An advantage of the present invention is that it indicates the presence or absence of information items without wasting any portion of a storage zone.

Another advantage of the invention is that it is readily adaptable to a variety of storage systems such as inked, perforated, or magnetic media.

Further, errors in the information processing operation due to the failure to distinguish between zeros and the absence of information have been avoided by the use of excess binary codes in which the coded combination of all zeros is omitted. However, this increases the complexity of the information processing equipment necessary to handle such codes.

Therefore, another advantage of the invention is that it is readily adaptable to ordinary binary information processors.

Other objects, features and advantages will become apparent from the following description when read with the drawings in which:

Figs. 4 to 12 show the logical symbols which are used to illustrate the block diagrams of Figs. 1 and 3.

Figs. 4a to 12a show the corresponding circuits of the logical symbols.

Fig. 4 shows the logical symbol for a gate.

Figure 4:
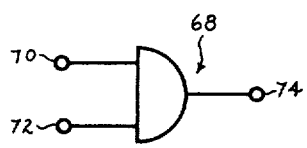
Figure 4A:
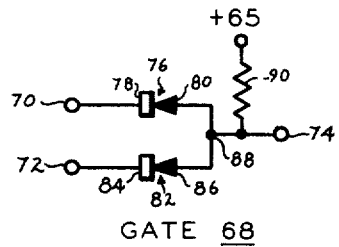

Fig. 4a schematically illustrates the circuit of a gate.

Figure 5:
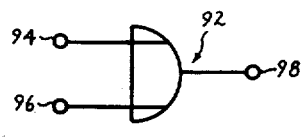

Fig. 5 shows the logical symbol for a buffer.

Figure 5A:
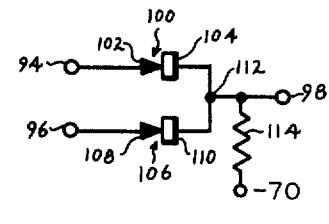

Fig. 5a illustrates the circuit of a buffer.

Figure 6:
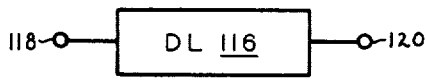

Fig. 6 shows the logical symbol for a delay line.

Figure 6A:
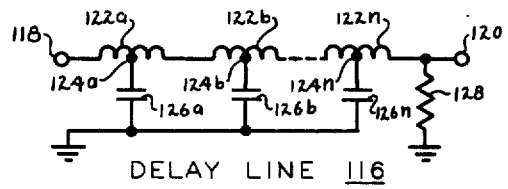

Fig. 6a illustrates the schematic circuit of a delay line.

Fig. 7 shows the logical symbol of a pulse amplifier.

Fig. 7a schematically illustrates the circuit of a pulse amplifier.

Fig. 8 shows the logical symbol of a D.-C. amplifier.

Fig. 8a illustrates the circuit of a D.-C. amplifier.

Fig. 9 shows the logical symbol of a reading amplifier.

Fig. 9a illustrates schematically the circuit of a reading amplifier.

Fig. 10 shows the logical symbol of a reset dominant flip flop.

Fig. 10a schematically illustrates the circuit of a reset dominant flip flop.

Fig. 11 shows the logical symbol of a delay flip flop.

Fig. 11a illustrates the circuit of a delay flip flop.

Fig. 12 shows the logical symbol of a writing amplifier.

Fig. 12a illustrates schematically the circuit of a writing amplifier.

*Detailed description*

Figure 1:
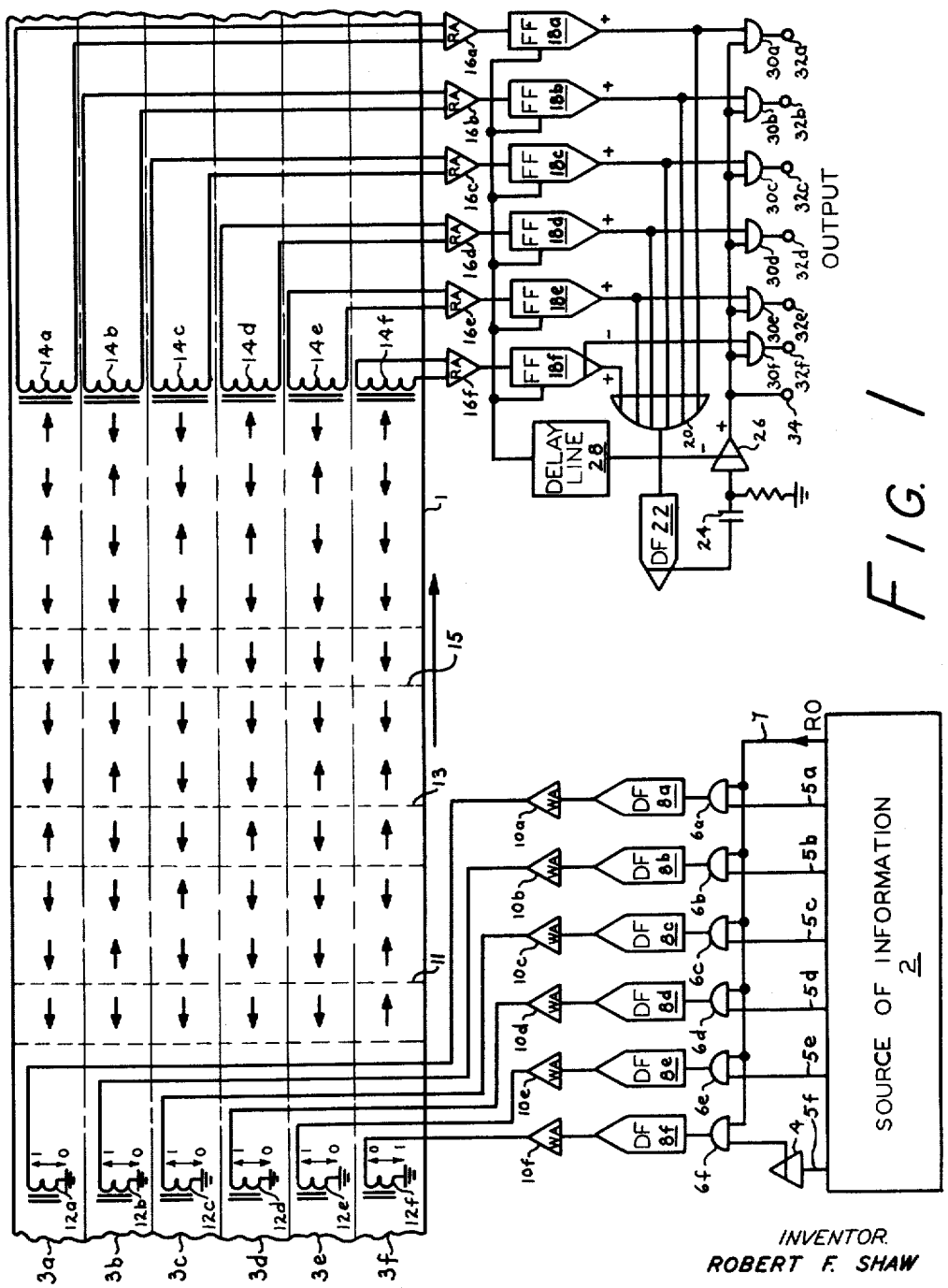
Fig. 1 is a block diagram of an information processing system in accordance with one embodiment of the invention.

Referring now to the drawings in detail, and particularly to the information processing system in accordance with the first embodiment of the invention shown in Fig. 1, a magnetically coated tape 1 is provided upon which information is to be stored. The tape 1 is divided into a plurality of longitudinal channels or tracks 3 and into a multitude of storage zones such as zones 11, 13 and 15. Each storage zone extends laterally across the tape 1 and is composed of a plurality of adjacent storage positions, one for each channel.

A source of information 2 is coupled via the lines 5a to 5e to one input of each of the gates 6a to 6e, respectively, and via the line 5f and the pulse amplifier 4 to one input of the gate 6f. The read-out line 7 of the source of information 2 is connected to the other input of the gates 6. The source of information 2 may be, for example, an information processor which has processed information and is now prepared to read out the information and store it in the tape 1.

The gates 6 are coupled via the delay flip flops 8 to the writing amplifiers 10 which in turn are connected to the writing heads 12 which are associated with the channel 3.

It will be assumed that the source of information 2 operates with a six digit binary system of notation, though it should be apparent that the invention is not limited thereto. Further it will be assumed that the signal potential levels in the source of information 2 are plus five volts (sometimes called positive signals) representing the binary digit 1 or the read-out signal, and minus ten volts (sometimes called negative signals) representing the binary digit 0.

Initially, when no information is being transferred from the source of information 2 to the tape 1, no read-out signal RO is present on the read-out line 7, the delay flip flops 8 are in a reset condition, and the writing amplifiers 10 are in a normally non-conductive state. With the writing amplifiers 10 in the normally non-conductive state current flows through the windings of the respective writing heads 12 to ground. If positive signals are applied to the writing amplifiers 10, they are driven into a conductive state and cause current to flow through the windings of the respective writing heads 12 in the opposite direction from that which obtains when the writing amplifiers 10 are in the non-conductive state. The result normally is to magnetically polarize the storage positions in one direction (hereinafter referred to as the normal magnetic polarization) when the writing amplifiers 10 are in the normal non-conductive state and to magnetically polarize the storage positions in the opposite direction (hereinafter referred to as the given magnetic polarization) when the writing amplifiers are in a conductive state.

Thus, with no information being transferred from the source of information 2 to the tape 1, all of the writing amplifiers 10 are in a non-conductive state and each storage position of the storage zone under the writing heads 12 is magnetically polarized in the normal direction.

Hence the presence of normal magnetic polarization in all of the storage positions of a storage zone indicates the absence of an information item (see storage zone 15).

Now, let it be assumed that the binary coded decimal digit nine (001001) is to be transferred from the source of information 2 to the tape 1.

The least significant binary digit 1 appears as a positive signal at gate 6a; the second significant binary digit 0 appears as a negative signal at the gate 6b; the third significant binary digit 0 appears as a negative signal at the gate 6c; the fourth significant digit 1 appears as a positive signal at the gate 6d; the fifth significant binary digit 0 appears as a negative signal at the gate 6e; and the sixth significant binary digit 0 appears as a positive signal at the gate 6f due to an inversion by the pulse amplifier 4. The positive read-out signal RO renders the gates 6a, 6d and 6f effective for passing positive signals representing the first, fourth and sixth significant binary digits to set the delay flip flops 8a, 8d and 8f.

The delay flip flops 8a, 8d and 8f remain set for a period long enough to apply positive signals to the writing amplifiers 10a, 10d and 10f and cause them to conduct and apply writing signals to the writing heads 12a, 12d and 12f such that a given magnetic polarization is stored in the first, fourth and sixth storage position of the storage zone in which that item is being stored (see storage zone 13).

Thus, a portion of the binary coded decimal digit nine, namely the first five significant digits 01001, is stored in accordance with a predetermined representation in which the presence of a given magnetic polarization represents the binary digit one and the absence of the given magnetic polarization represents the binary digit zero. The remaining portion of the binary coded decimal digit nine, namely the sixth significant digit 0, is stored in accordance with a representation which is inverse to that of the predetermined representation such that the presence of the given magnetic polarization represents the binary digit zero and the absence of the given magnetic polarization represents the binary digit one.

Next, let it be assumed that the binary coded decimal digit zero (000000) is to be transferred from the source of information 2 to the tape 1.

All the digits of the number zero appear as negative signals at the respective gates 6 except the sixth significant digit which, due to the inversion by the pulse amplifier 4, appears as a positive signal at gate 6f.

The read-out signal RO renders the gate 6f effective for passing the positive signal which in turn sets the delay flip flop 8f.

The delay flip flop 8f produces a positive signal which causes writing amplifier 10f to conduct and apply a writing signal to the writing head 12f such that the given magnetic polarization is stored in and only in the sixth storage position of the storage zone in which that item is being stored (see storage zone 11).

Thus, it is apparent that information and especially zeros can be distinguished from the absence of information by the presence of the given magnetic polarization in at least one of the storage positions of a storage zone.

With this system, the ordinary binary code can be modified such that all information can be distinguished from the absence of information as shown in the following table:

| Information Item | Ordinary Binary Code | Modified Binary Code |
| --- | --- | --- |
| 0 | 000000 | 100000 |
| 1 | 000001 | 100001 |
| 2 | 000010 | 100010 |
| 3 | 000011 | 100011 |
| 4 | 000100 | 100100 |
| 5 | 000101 | 100101 |
| 6 | 000110 | 100110 |
| 7 | 000111 | 100111 |
| 8 | 001000 | 101000 |
| 9 | 001001 | 101001 |
| − | 001010 | 101010 |
| + | 001011 | 101011 |
| = | 001100 | 101100 |
| Σ | 001101 | 101101 |
| ( | 001110 | 101110 |
| ) | 001111 | 101111 |
| A | 010000 | 110000 |
| B | 010001 | 110001 |
| C | 010010 | 110010 |
| D | 010011 | 110011 |
| E | 010100 | 110100 |
| F | 010101 | 110101 |
| G | 010110 | 110110 |
| H | 010111 | 110111 |
| I | 011000 | 111000 |
| J | 011001 | 111001 |
| K | 011010 | 111010 |
| L | 011011 | 111011 |
| M | 011100 | 111100 |
| N | 011101 | 111101 |
| O | 011110 | 111110 |
| P | 011111 | 111111 |
| Q | 100001 | 000001 |
| R | 100010 | 000010 |
| S | 100011 | 000011 |
| T | 100100 | 000100 |
| U | 100101 | 000101 |
| V | 100110 | 000110 |
| W | 100111 | 000111 |
| X | 101000 | 001000 |
| Y | 101001 | 001001 |
| Z | 101010 | 001010 |
| Space | 101011 | 001011 |

It should be noted that the ordinary binary code number 100000 is not used.

From an examination of the table it will be apparent that in the modified binary code at least one binary digit 1 is present in every coded combination. Therefore, if information is stored in accordance with this code the given magnetic polarization corresponding to the binary digit 1 will always be present in at least one storage position of a storage zone in which an information item is present, whereas the given magnetic polarization will not be present in any storage position of a storage zone in which there is an absence of an information item.

The equipment for reproducing the coded information stored in the tape 1 is shown in Fig. 1. The reading heads 14 are coupled via the reading amplifiers 16 to the flip flops 18. The positive outputs of the flip flops 18a to 18e are coupled to one input of each of the gates 30a to 30e, respectively, while the negative output of the flip flop 18f is coupled to one input of the gate 30f.

The positive outputs of the flip flops 18 are also connected via buffer 20 to the delay flip flop 22. The output of the delay flip flop 22 is coupled via a differentiating circuit 24 to pulse amplifier 26. The positive output of the pulse amplifier 26 is commonly connected to the other input of the gates 30 and to the output terminal 34. The negative output of the pulse amplifier 26 is connected via delay line 28 to the reset terminals of the flip flops 18. The output of the gates 30a to 5 are connected to the output terminals 32a to f, respectively.

In operation, with no information stored in the tape 1 the reading amplifiers 16 are in a cutoff condition, the flip flops 18 are in a reset condition, the delay flip flop 22 is in a reset condition, and the pulse amplifier 26 is in a cutoff condition and, as will be hereinafter explained, a negative signal is present at the positive output of the pulse amplifier. Consequently, the negative signal is maintained at the output terminal 34, indicating the absence of an information item in the storage zone under examination, and at one input of each of the gates 30 to effectively block them.

Now let it be assumed that the modified binary coded decimal digit nine (101001) stored in storage zone 13 is to be translated into the ordinary binary code (001001) and transferred to the output terminals 32. The reading heads 14a, 14d and 14f sense the given magnetic polarization in the first, fourth and sixth significant storage positions and apply signals to the reading amplifiers 16a, 16d and 16f, respectively. These signals are amplified by the reading amplifiers 16a, 16d and 16f and applied to set the flip flops 18a, 18d and 18f.

Positive step functions are applied from the positive outputs of the set flip flops 18a and 18d to one input of the gates 30a and 30d, respectively, and to the buffer 20 while a negative step function is simultaneously applied from the negative output of the set flip flop 18f to one input of the gate 30f. The flip flop 18f thereby inverts the signal representing the sixth significant digit back to the ordinary binary code. The flip flops 18b, 18c and 18e which remain in a reset condition maintain negative signals at one input of each of the gates 30b, 30c and 30e, respectively. Inasmuch as at least one of the inputs of the buffer 20 has a positive step function applied thereto, the buffer 20 passes this positive step function and sets the delay flip flop 22. The delay flip flop 22 remains set for a sufficient period of time to assure that all storage positions of the storage zone which contain 1's have had time to set their respective flip flops, and then on recovery produces a positive signal which is differentiated by the differentiating circuit 24 and applied to the pulse amplifier 26. The differentiated signal causes the pulse amplifier 26 to conduct and apply a positive signal to the output terminal 34, indicating the presence of an information item in the storage zone under examination in the tape 1, and to the other input of the gates 30 to render them effective for passing a combination of positive and negative signals representing the ordinary binary coded information item nine (010001) to the output terminals 32. The pulse amplifier 26 also applies a negative signal via the delay line 28 to reset the flip flop 18 in preparation for the next storage zone to be examined in the tape 1. The period of the delay line 28 is sufficient to permit the information item to be gated to the output terminals 32 before the flip flops 18 are reset. Next let it be assumed that the modified binary coded decimal digit zero (100000) stored in the storage zone 11 is to be translated into the ordinary binary code (000000) and transferred to the output terminals 32. The reading head 14f senses the given magnetic polarization in the sixth significant storage position and applies a signal to the reading amplifier 16f. The reading amplifier 16f conducts and applies a signal to set the flip flop 18f.

A negative step function is applied from the negative output of the set flip flop 18f to one input of the gate 30f while the flip flops 18a to 18e, which remain in a reset condition, maintain a negative signal at one input of each of the gates 30a to 30e. A positive step function is applied from the positive output of the set flip flop 18f via the buffer 20 to set the delay flip flop 22. The delay flip flop 22 produces a negative signal which is differentiated by the differentiating circuit 24 and applied to the pulse amplifier 26. The positive portion of the differentiated signal causes the pulse amplifier 26 to conduct and apply a positive signal to the output terminal 34, indicating the presence of an information item in the storage zone under examination in the tape 1, and to the other input of each of the gates 30 to render them effective for passing signals representing ordinary binary coded information item zero (000000) to the output terminals 32. The pulse amplifier 26 also applies a negative signal via the delay line 28 to reset the flip flop 18f in preparation for the next storage zone to be examined in the tape 1.

Thus, whenever an information item is present in a storage zone under examination in the tape 1, a positive signal will be present at the output terminal 34 indicating the presence of the information item in that storage zone, and an ordinary binary coded combination of signals representing the information item will be passed through the gates 30 and applied to the output terminals 32. However, when there is an absence of an information item in a storage zone under examination in the tape 1, no positive signal will be present at the output terminal 34 and thus no information item will be indicated in that storage zone, and the gates 30 will be blocked. This method of storing and reproducing information items is applicable to magnetic storage drums in which information items are stored in a serial manner in each channel of the medium. Here, each channel of the medium is divided into a multitude of storage zones each of which is composed of a plurality of storage positions corresponding to the predetermined number of bits of information in each information item. The storing of information is so timed that the signal representing the sixth significant bit in each information item is inverted before being recorded in the sixth significant storage position of each storage zone in the magnetic medium. Likewise, the reproduction of the stored information is so timed that the bit stored in the sixth significant storage position of each storage zone is inverted before being applied to the output terminal.

Figure 2:
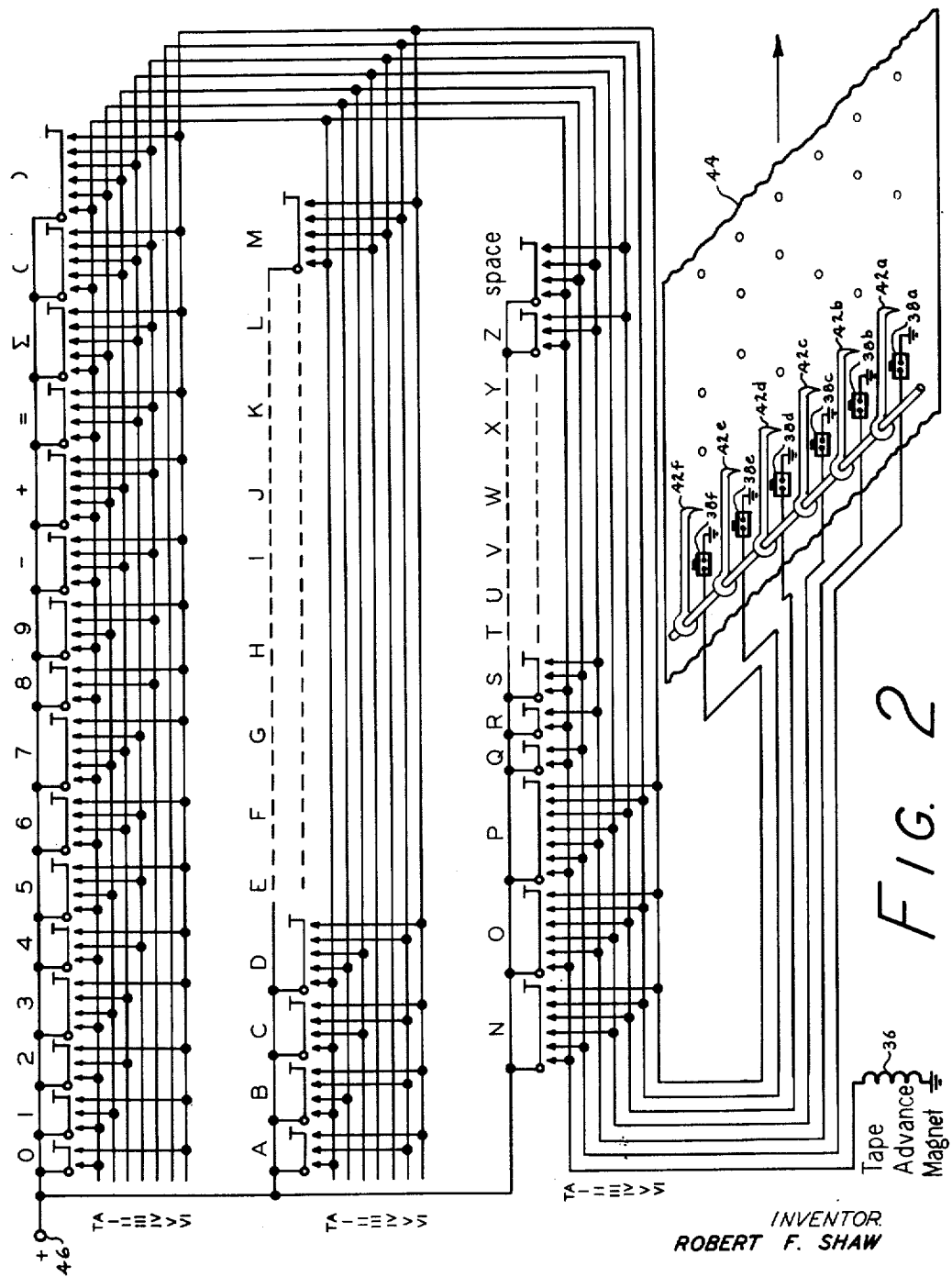
Fig. 2 is a schematic diagram of the storing equipment of an information processing system in accordance with a second embodiment of the invention.
Figure 3:
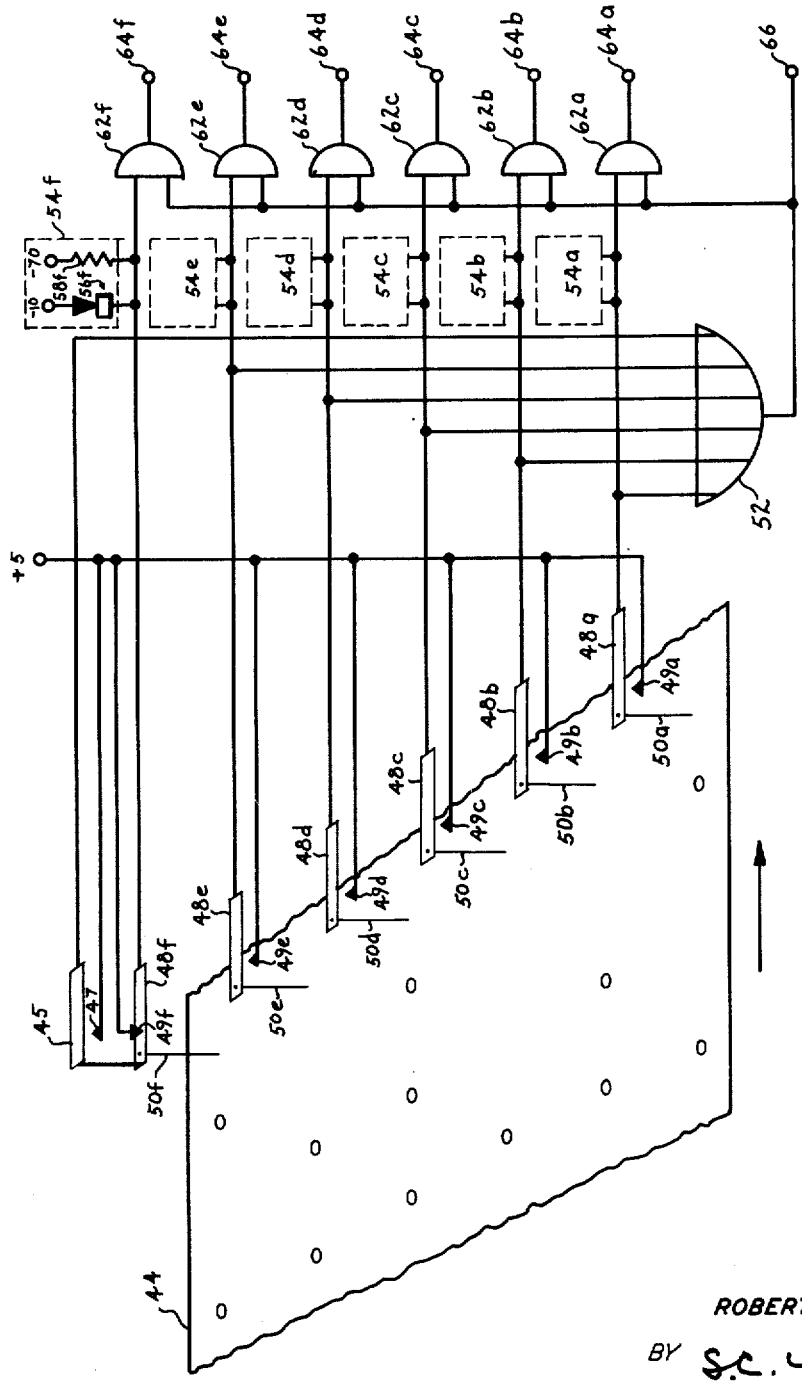
Fig. 3 is a block diagram of the reproducing equipment of an information processing system in accordance with the second embodiment of the invention.

Referring now to the information processing system in accordance with the second embodiment of the invention shown in Figs. 2 and 3, a paper tape 44 is provided having information stored in coded form by combinations of perforations and absence of perforations. Information is stored in storage zones and storage positions in the same manner as in tape 1 of Fig. 1.

The equipment for storing the information is illustrated in Fig. 2. A keyboard is schematically shown being provided with a plurality of keys connected to a positive supply terminal 46. The key contacts of each key of the keyboard are connected in different combinations to the six lines I, II, III, IV, V and VI in accordance with the modified binary code. There is an additional key contact of each key connected to a tape advance line TA.

The six lines I, II, III, IV, V and VI are connected to the magnets 38 while the tape advance line is connected to a slow operating tape advance magnet 36. The magnets 38 when operated attract their armatures 42 and cause holes to be punched in the tape 44.

In operation, if no information is to be stored in the tape 44 the space key will be depressed and a positive signal will be applied to the tape advance magnet 36 to advance the tape 44. Inasmuch as no signal is applied to any of the magnets 38 the armatures 42 will not be operated and no information will be punched in the tape 44. Hence the absence of a perforation in a storage zone indicates the absence of an information item in that storage zone.

Now, let it be assumed that the decimal digit nine is to be stored in the tape 44. The nine key is depressed and positive signals are applied via the lines TA, I, IV and VI to operate the tape advance magnet 36, magnet 38a, magnet 38d and magnet 38f. These magnets in operating will overcome the restoring force of springs (not shown) and attract their armatures 42a, 42d and 42f and cause holes to be punched in the tape 44. At the completion of the perforation operation the springs will then restore the armatures to their unoperated positions and then tape 44 will be advanced to the next storage zone. Consequently, the decimal digit nine will be stored in that storage zone in accordance with the modified binary code (101001).

Next, let it be assumed that the decimal digit zero is to be stored in the tape 44. The zero key is depressed and positive signals are applied via lines TA and VI to the tape advance magnet 36 and the magnet 38f. The magnet 38f in operating will attract the armature 42f and cause a hole to be punched in the tape 44. On completion of the perforation of the hole the armature 42f will be restored to its unoperated position and the tape will then advance to the next storage zone. Consequently the decimal digit zero will be stored in the tape 44 in accordance with the modified binary code (100000).

Thus, information and especially zeros can be distinguished from the absence of information by the presence of a perforation in at least one of the storage positions of a storage zone.

The equipment for reproducing the information stored in the tape 44 is shown in Fig. 3.

The tape 44 is positioned to pass under the sensing pins 50 which are attached to the contact arms 48. A second contact arm 45 is attached to the contact arm 48f to form a double acting switch. The contact arms 48a to 48f and the contact arm 45 are associated with contacts 49a to 49f and 47, respectively, which in turn are coupled to a positive supply bus of five volts.

The contact arms 48a to 48f are connected to one input of each of the gates 62a to 62f, respectively, and to the clamping circuits 54a to 54f, respectively. Each clamping circuit is composed of a crystal diode 56, whose anode is connected to a negative supply bus of ten volts and whose cathode is connected to the associated contact arm 48, and a resistor 58. One end of the resistor 58 is connected to a negative supply bus of seventy volts and the other end is connected to the associated contact arm 48. All of the crystal diodes 56 are initially in a conductive state, as their anodes are more positive than their cathodes, except crystal diode 56f which has its cathode connected to the positive supply bus of five volts via contact arm 48f and contact 49f and its anode to the negative supply bus of ten volts. Hence, initially, a positive signal is maintained at one input of the gate 62f while negative signals are maintained at one input of each of the gates 62a to 62e.

The contact arm 45 and the contact arms 48a to 48e are also connected to the buffer 52. The output of the buffer 52 is connected to the other input of each of the gates 62a to 62f and to the output terminal 66. The outputs of the gates 62a to 62f are connected to the output terminals 64a to 64f, respectively.

In operation, with no information stored in the tape 44, the contact arms 48 are in the unoperated position (as shown) and a positive signal is maintained at one input of the gate 62f while negative signals are maintained at one input of each of the gates 62a to 62e and at the inputs of the buffer 52. The buffer 52 passes a negative signal to the output terminal 66, indicating the absence of an information item in the storage zone under examination in the tape 44, and to the other input of each of the gates 62 thereby effectively blocking the gate 62.

Now, let it be assumed that the modified binary coded decimal digit nine (101001) stored in the tape 44 is to be translated into the ordinary binary code (001001)

and transferred to the output terminals 64. The sensing pins 50a, 50d and 50f sense the presence of a perforation in the first, fourth and sixth significant storage positions of the storage zone under examination. Consequently, contact arms 48a and 48d are connected to contacts 49a and 49d, respectively causing positive signals to be applied to one input of each of the gates 62a and 62d. The contact arm 48f is disconnected from the contact 49f causing the clamping circuit 54f to apply a negative signal to one input of the gate 62f. Inasmuch as the contact arms 48b, 48c and 48e are unoperated, a negative signal is maintained at one input of each of the gates 62b, 62c and 62e.

The operation of the contact arms 48a, 48d and 45 also cause positive signals to be applied from their associated contacts to the buffer 52. The buffer 52 applies a positive signal to the output terminal 66, indicating the presence of an information item in the storage zone under examination in the tape 44, and to the other input of each of the gates 62 to render them effective for passing signals corresponding to the ordinary binary coded information item nine (001001) to the output terminals 64.

Next, let it be assumed that the modified binary coded decimal digit zero (100000) stored in the tape 44 is to be translated into the ordinary binary code (000000) and transferred to the output terminals 64.

The sensing pin 50f senses the presence of a perforation in the sixth significant storage position of the storage zone under examination. Consequently, the contact arm 48f is disconnected from the contact 49f causing the clamping circuit 54f to apply a negative signal to one input of the gate 62f. Inasmuch as the contact arms 48a to 48e are inoperative, negative signals are maintained at one input of each of the gates 62a to 62e.

The operation of the contact arm 48f causes the contact arm 45 to connect to the contact 47 causing a positive signal to be applied to the buffer 52. The buffer 52 applies a positive signal to the output terminal 66 indicating the presence of an information item in the storage zone under examination in the tape 44, and to the other inputs of each of the gates 62 to render them effective for passing signals corresponding to the ordinary binary coded information item zero (000000) to the output terminals 64.

Thus, it should be noted in both embodiments of the invention, shown in Figs. 1 to 3, whenever an information item is present in the storage zone under examination in the tape, a positive signal will be present at the corresponding output terminal 34 or 66, indicating the presence of the information item in that storage zone, and an ordinary binary coded combination of signals representing the information item will be passed through the gates 30 or 62 and applied to the output terminals 32 or 64, respectively.

Thus, the invention provides an improved method and apparatus for processing information such that it may be distinguished from the absence of information. More particularly, in accordance with the method and apparatus disclosed, zeros are processed such that they may be distinguished from the absence of information. The major advantages of the invention are that information may be processed without wasting any portion of a storage zone in which information is stored and that the invention is readily adaptable to perforated or magnetized storage media.

*Description of symbols*

The logical symbols employed to simplify the detailed description of the block diagrams of Figs. 1, 2 and 3 are shown in Figs. 4 to 12. Figs. 4a to 12a show the corresponding circuits of the logical symbols. For convenient reference, all positive and negative supply buses will generally be identified with a number corresponding with their voltage. The circuitry terminals corresponding to the same symbol terminals are identified by the same character reference numbers.

*Gate*

The gates used in the information processing system are of the "coincidence" type, each comprising a crystal diode network which functions to receive input signals via a plurality of input terminals and to pass the most negative signal.

The symbol for a representative gate 68, having two input terminals 70 and 72, is shown in Fig. 4.

If a potential of minus ten volts is present at one or both of the input terminals 70 and 72, a potential of minus ten volts will exist at the output terminal 74. Therefore, if one of the input signals to the input terminals 70 and 72 is positive and the other signal is negative, the negative signal is passed and the positive signal is "blocked."

When there is a coincidence of positive signals at the two input terminals 70 and 72, a positive signal is transmitted from the output terminal 74. In such case, it may be stated that a positive signal is "gated" or "passed" by the gate 68. When all of the input signals to a gate except one are made positive, in preparation for passing a positive signal when the remaining input signal is made positive, the gate may be described as being "primed" or "conditioned."

The schematic details of the gate 68 are shown in Fig. 4a. Gate 68 includes the crystal diodes 76 and 82. Each of the input terminals 70 and 72 is coupled to one of the crystal diodes 76 and 82. Crystal diode 76 comprises the cathode 78 and the anode 80. Crystal diode 82 comprises the anode 86 and the cathode 84. More particularly, the input terminals 70 and 72 are respectively coupled to the cathode 78 of the crystal diode 76 and the cathode 84 of the crystal diode 82. The anode 80 of the crystal diode 76 and the anode 86 of the crystal diode 82 are interconnected at the junction 88 which is coupled to the output terminal 74, and via the resistor 90 to the positive voltage bus 65.

If negative potentials are simultaneously present at the input terminals 70 and 72, both of the crystal diodes 76 and 82 will conduct, since the positive supply bus 65 tends to make the anodes 80 and 86 more positive. The voltage at the junction 88 will then be minus ten volts since, while conducting, the anodes 80 and 86 of the crystal diodes 76 and 82 assume the potential of the associated cathodes 78 and 84.

When a positive signal is fed only to the input terminal 70, the cathode 78 is raised to a positive five volts potential and is made more positive than the anode 80, so that crystal diode 76 stops conducting. As a result, the potential at the junction 88 remains at the negative ten volts level. In a similar manner, when a positive signal is only present at the input terminal 72, the voltage at the junction 88 will not be changed.

When the signals present at both input terminals 70 and 72 are positive, the anodes 80 and 86 are raised to approximately the same potential as their associated cathodes 78 and 84 and the potential at the junction 88 rises to a positive potential of five volts.

The potential which exists at the junction 88 is transmitted from the gate 68 via the connected output terminal 74.

In the above described manner, the gate 68 is frequently used as a switch to govern the passage of one signal by the presence of one or more signals which control the operation of the gate 68.

*Buffer*

The buffers used in this information processing system are also known as "or" gates. Each buffer comprises a crystal diode network which functions to receive input signals via a plurality of input terminals and to pass the most positive signal.

The symbol for a representative buffer 92, having two input terminals 94 and 96, is shown in Fig. 5.

If a positive potential of five volts exists at one or both of the input terminals 94 or 96, a positive potential of five volts will exist at the output terminal 98. If a negative potential of ten volts is present at both of the input terminals 94 and 96, a negative potential of ten volts will be present at the output terminal 98.

The schematic details of the buffer 92 are shown in Fig. 5a. The buffer 92 includes the two crystal diodes 100 and 106. The crystal diode 100 comprises the anode 102 and the cathode 104. Crystal diode 106 comprises the anode 108 and the cathode 110. The anode 102 of the crystal diode 100 is coupled to the input terminal 94. The anode 108 of the crystal diode 106 is coupled to the input terminal 96. The cathodes 104 and 110 of the crystal diodes 100 and 106, respectively, are joined at the junction 112 which is coupled to the output terminal 98, and via the resistor 114 to the negative supply bus 70. The negative supply bus 70 tends to make the cathodes 104 and 110 more negative than the anodes 102 and 108, respectively, causing both crystal diodes 100 and 106 to conduct.

When negative ten volt signals are simultaneously present at input terminals 94 and 96, the crystal diodes 100 and 106 are conductive, and the potential at the cathodes 104 and 110 approaches the magnitude of the potential at the anodes 102 and 108. As a result, a negative potential of ten volts appears at the output terminal 98.

If the potential at one of the input terminals 94 or 96 increases to plus five volts, the potential at the junction 112 approaches the positive five volts level as this voltage is passed through the conducting crystal diode 100 or 106 to which the voltage is applied. The other crystal diode 100 or 106 stops conducting since its anode 102 or 108 becomes more negative than the junction 112. As a result, a positive potential of five volts appears at the output terminal 98.

If positive five volt signals are fed simultaneously to both input terminals 94 and 96, a positive potential of five volts appears at the output terminal 98, since both crystal diodes 100 and 106 will remain conducting. Thus the buffer 92 functions to pass the most positive signal received via the input terminals 94 and 96.

*Delay line*

The symbol for a representative electrical delay line 116 which is a lumped parameter type delay line and which functions to delay received pulses for discrete periods of time, is shown in Fig. 6.

The delay line 116 comprises the input terminal 118 and the output terminal 120. A pulse which is fed via the input terminal 118 to the delay line 116 will be delayed for a predetermined period of time before appearing at the output terminal 120.

The delay line 116 shown in Fig. 6a comprises a plurality of inductors 122 connected in series, with the associated capacitors 126 which couple a point 124 on each inductor 122 to ground. A signal is fed into the delay line 116 at the input terminal 118 and the maximum delay occurs at the output terminal 120. The delay line 116 is terminated by a resistor 128 in order to prevent reflections.

*Pulse amplifier*

The symbol for a representative pulse amplifier is shown in Fig. 7. When a positive pulse is fed to the pulse amplifier 130 via the input terminal 132, the pulse amplifier 130 functions to transmit a positive pulse which swings from minus ten to plus five volts from its positive output terminal 134, and a negative pulse which swings from plus five to minus ten volts from its negative output terminal 136. At all other times, the pulse amplifier 130 has a negative potential of ten volts at its positive output terminal 134 and a positive potential of five volts at its negative ouput terminal 136.

The detailed circuitry of the pulse amplifier 130 is shown in Fig. 7a. The pulse amplifier 130 includes the vacuum tube 152, the pulse transformer 160 and associated circuitry. The vacuum tube 152 comprises the cathode 158, the grid 154 and the anode 156. The pulse transformer comprises the primary winding 162 and the secondary windings 164 and 166.

The crystal diode 138 couples the grid 154 of the vacuum tube 152 to the input terminal 132, the anode 140 of the crystal diode 138 being coupled to the input terminal 132, and the cathode 142 being coupled to the grid 154. The negative supply bus 70 is coupled to the grid 154 via the resistor 144 and tends to make the crystal diode 138 conductive. The grid 154 and the cathode 142 of the crystal diode 138 are also coupled to the cathode 150 of the crystal diode 146, whose anode 148 is coupled to the 5 volt negative supply bus. The crystal diode 146 clamps the grid 154 at a potential of minus five volts thus preventing the voltage applied to the grid 154 from becoming more negative than minus five volts.

When a voltage more positive than minus five volts is transmitted to the input terminal 132, the crystal diode 138 conducts and the voltage is applied to the grid 154. Since the crystal diode 146 clamps the grid 154 and the cathode 142 of the crystal diode 138 at minus five volts, any voltage more negative than minus five volts will cause the crystal diode 138 to become non-conductive, and the input voltage will be blocked at the crystal diode 138. Thus, the clamping action of the crystal diode 146 will not affect the circuitry which supplies the input voltage.

The cathode 158 of the vacuum tube 152 is connected to ground potential. The anode 156 of the vacuum tube 152 is coupled by the primary winding 162 of the pulse transformer 160 to the positive supply bus 250. The outer ends of the secondary windings 164 and 166 of the pulse transformer 160 are coupled respectively to the positive output terminal 134 and the negative output terminal 136. The inner ends of the secondary windings 164 and 166 are coupled respectively to the 10 volt negative supply bus 10 and the 5 volt positive supply bus.

A positive pulse which is fed to the grid 154 of the vacuum tube 152 will be inverted at the primary winding 162 of the pulse transformer 160 which is wound to produce a positive pulse in the secondary winding 164 and a negative pulse in the secondary winding 166. These pulses respectively drive the positive output terminal 134 up to a positive five volts potential and the negative output terminal 136 down to a negative ten volts potential because of the circuit parameters.

When the vacuum tube 152 is non-conducting, the negative ten volts potential is fed through the secondary winding 164 and appears at the positive output terminal 134. At the same time, the positive five volts potential is fed through the secondary winding 166 to the negative output terminal 136. These latter conditons are the normally existing conditions at the output terminals 134 and 136.

*D.-C. amplifier*

The symbol for a representative D.-C. amplifier 168 is shown in Fig. 8. When a positive signal is present at the input terminal 170, a positive signal of five volts appears at the positive output terminal 172 and a negative signal of ten volts is present at the negative output terminal 174. If a negative potential is present at the input terminal 170, the potentials at the output terminals 172 and 174 are reversed.

As shown in Fig. 8a, the D.-C. amplifier 168 includes the gate 180, the buffer 182, the vacuum tube 186, the transformer 210, the full-wave rectifiers 211 and 213, and the filters 238 and 240.

The input terminal 170 is connected to one input terminal of the gate 180. The other input terminal of the gate 180 is fed a one megacycle carrier signal from the signal generator 178 which is a signal generator of known type. The megacycle carrier signal swings from minus ten to plus five volts.

One input terminal of the buffer 182 is connected to the output terminal of the gate 180. The other input terminal of the buffer 182 is connected to the negative supply bus 5. The buffer 182 couples the output of the gate 180 to the control grid 194 of the vacuum tube 186.

The vacuum tube 186 is a five element tube having a grounded cylindrical shield 196, and includes the anode 188 connected via the primary winding 212 of the transformer 210 to a positive supply bus 250. The junction of the positive supply bus 250 and the primary winding 212 is coupled via the capacitor 208 to ground. The vacuum tube 186 also includes the suppressor grid 190 which is connected to ground, the screen grid 192 which is connected to the positive supply bus 125 and via the capacitor 184 to ground, and the cathode 198 which is grounded.

The anode 188 of the vacuum tube 186 is also connected via the coupling capacitor 202 to the neon tube 200 which is grounded. The capacitor 206 is connected in parallel with the primary winding 212 of the transformer 210 to form the parallel tank circuit 204 which is tuned to the frequency of the carrier signal.

The full-wave rectifier 211 is connected to the secondary winding 209 having its center tap connected to the negative supply bus 10. The full-wave rectifier 211 includes the pair of crystal diodes 214 and 220. The anodes 216 and 222 of the crystal diodes 214 and 220 are respectively coupled to opposite ends of the secondary winding 209 of the transformer 210, and the cathodes 218 and 224 of the crystal diodes 214 and 220 are interconnected.

The full-wave rectifier 213 is connected to the secondary winding 207 having its center tap connected to the positive supply bus 5.

The full-wave rectifier 213 includes the pair of crystal diodes 226 and 232. The cathodes 230 and 236 of the crystal diodes 226 and 232 are coupled to opposite ends of the secondary winding 207, and the anodes 228 and 234 of the crystal diodes 226 and 232 are connected together.

The filter 238 which couples the cathodes 218 and 224 of the crystal diodes 214 and 220 to the positive output terminal 172 is a parallel tank circuit which includes the capacitor 244 and the inductor 242. The capacitor 246 connects the positive output terminal 172 to the negative supply bus 10. The positive output terminal 172 is also coupled via the resistor 256 to the negative supply bus 70.

The filter 240, which couples the cathodes 230 and 236 of the crystal diodes 226 and 232 to the negative output terminal 174, is a parallel tank circuit which includes the capacitor 252 and the inductor 248. The capacitor 254 connects the negative output terminal 174 to the positive supply bus 5. The negative output terminal 174 is also coupled by the resistor 258 to the positive supply bus 65.

Initially, the crystal diodes 214 and 220 are in a conductive state such that the potential at the positive output terminal 172 is approximately minus ten volts. Similarly, the crystal diodes 226 and 232 are initially in a conductive state such that the potential at the negative output terminal 174 is approximately plus five volts.

When a signal is fed to the input terminal 170 it is combined with the one megacycle carrier and fed to the buffer 182. As previously noted, one input terminal of the buffer 182 is connected to a negative five volts supply bus so that all signals at the output of the gate 180 which are equal to or more positive than minus five volts will be passed by the buffer 182. A signal passed by the buffer 182 is applied to the control grid 194 of the vacuum tube 186. The signal is amplified by vacuum tube 186 and appears across the parallel tank circuit 204. The parallel tank circuit 204 is tuned to the frequency of the incoming signal so that the maximum signal will be passed by the parallel tank circuit 204 to the full-wave rectifiers 211 and 213.

The full-wave rectifier 211 delivers a positive signal which is then filtered by the filter 238 to appear as a positive direct-current potential of approximately five volts at the positive output terminal 172. The full-wave rectifier 213 delivers a negative signal which is then filtered by the filter 240 to appear as a negative direct-current potential of approximately ten volts at the negative output terminal 174.

Thus, if a positive signal is present at the input terminal 170, the voltage at the positive output terminal 172 is plus five volts, and the potential at the negative output terminal 174 is minus ten volts. However, if no signal is present at the input terminal 170, the voltage at the positive output terminal 172 will be minus ten volts, and the potential at the negative output terminal 174 will be plus five vols.

*Reading amplifier*

The symbol for a representative reading amplifier 260 is shown in Fig. 9. The reading amplifier 260 functions to amplify tape signals which are generated when a magnetic tape is fed past a magnetic head which is coupled to the input terminals 262 and 264. The amplified signals appear at the output terminal 266.

As shown in Fig. 9a, the reading amplifier includes the transformer 268 and the vacuum tubes 276 and 292. The transformer 268 comprises the primary winding 270 connected to the input terminals 262 and 264, the secondary winding 272 which couples the control grid 280 of the vacuum tube 276 to ground, and a core provided with an electrostatic shield which is connected to ground to prevent noise from being fed to the control grid 280. The resistor 274 is in parallel with the secondary winding 272. The vacuum tube 276 also includes the anode 278 which is connected via the resistor 286 to the positive supply bus 250, and the cathode 282 connected via the resistor 284 to ground.

The vacuum tube 292 comprises the anode 294 connected via the resistor 300 to the positive supply bus 250, the control grid 296 connected via the resistor 290 to the negative supply bus 1, and the cathode 298 connected to ground. The anode 278 of the vacuum tube 276 is coupled via the capacitor 288 to the control grid 296 of the vacuum tube 292. The anode 294 of the vacuum tube 292 is connected via the capacitor 302 to the output terminal 266.

When a signal is read from the tape by the magnetic head it is applied to the primary winding 270 of the transformer 268, the secondary winding 272 of the transformer 268 applies an amplified signal to the control grid 280 of the vacuum tube 276. The signal is amplified by vacuum tubes 276 and 292 to produce an amplified signal at the output terminal 266.

*Reset dominant flip flop*

A reset dominant flip flop of the type used in the information processing sytem is a bi-stable electronic circuit with two output terminals, one of which is maintained at one potential level and the other of which is maintained at a second potential level to indicate one stable state. Upon the receipt of a signal of suitable magnitude the potential levels of the two output terminals are exchanged to indicate a second stable state.

The symbol for a representative reset dominant flip flop 304 is illustrated in Fig. 10. The reset dominant flip flop 304 comprises the input terminal 306, a reset terminal 310, one positive output terminal 308 and one negative output terminal 312.

One stable state of the reset dominant flip flop 304 is the normal condition which is designated "reset" and exists when a negative potential of ten volts appears at the positive output terminal 308 and a positive potential of five volts appears at the negative output terminal 312. The other stable state is designated "set" and exists when a positive potential of five volts appears at the positive output terminal 308 and a negative potential of ten volts appears at the negative output terminal 312.

The reset dominant flip flop 304 is set when a positive signal is received via its input terminal 306, and a positive signal is present at its reset terminal 310. Therefore, the reset dominant flip flop 304 will not be set if a reset (negative) signal is present at the reset terminal 310.

Once set, the reset dominant flip flop 304 remains set as long as a positive signal is received via the reset terminal 310 even though the "setting" signal has terminated, but when the signal at the reset terminal 310 is negative, the reset dominant flip flop 304 is then reset.

After being reset, the reset dominant flip flop 304 remains reset until the above recited set conditions are fulfilled.

The detailed circuitry of the reset dominant flip flop 304 is illustrated in Fig. 10a in which use is made of logical symbols previously described.

The reset dominant flip flop 304 comprises the buffer 314, the gate 316 and the D.-C. amplifier 318 in series. The input terminal 306 is the input terminal of the buffer 314.

The buffer 314 is coupled to the gate 316. The reset terminal 310 is also coupled to the gate 316. When the gate 316 receives positive signals coincidentally from the buffer 314 and the reset terminal 310, the gate 316 passes a positive signal to the D.-C. amplifier 318, and causes the D.-C. amplifier 318 to generate a positive potential of five volts at its positive output terminal 308 and a negative potential of ten volts at its negative output terminal 312.

The positive output terminal 308 is coupled directly to the buffer 314 so that when a positive signal is generated at the positive output terminal 308, it is regenerative. The positive signal will be maintained at the positive output terminal 308 until the gate 316 is blocked by a negative signal received via its reset terminal 310.

It should be noted that a negative signal at the reset terminal 310 will prevent a positive pulse or signal at the input terminal 306 from setting the reset dominant flip flop 304.

*Delay flip flop*

A delay flip flop of the type used in the information processing system is a mono-stable electronic circuit with two output terminals, one of which is maintained at one potential level and the other of which is maintained at a second potential level to represent the stable state. Upon receipt of a signal of suitable magnitude, the potential levels of the two output terminals are exchanged for a predetermined period of time, after which the circuit automatically returns to its stable state.

The symbol for a representative delay flip flop 320 is illustrated in Fig. 11. The delay flip flop 320 comprises the input terminal 322, one positive output terminal 324, and one negative output terminal 328. The delay flip flop 320 may also include the reset terminal 326.

One stable state of the delay flip flop 320 is the normal condition which is designated "reset" and exists when a negative potential of ten volts appears at the positive output terminal 324 and a positive potential of five volts appears at the negative output terminal 328. The other state is designated "set" and exists when a positive potential of five volts appears at the positive output terminal 324 and a negative potential of ten volts appears at the negative output terminal 328.

The delay flip flop 320 is set when positive signals are simultaneously received via the input terminal 322 and the reset terminal 326. Once set, the delay flip flop 320 remains set for a predetermined period of time or for as long as a positive signal is received via all the reset terminals such as 326, depending on which is the shorter period of time.

The detailed circuitry of the delay flip flop 320 is illustrated in Fig. 11a in which use is made of logical symbols previously prescribed.

The delay flip flop 320 comprises the buffer 330, the gate 332, the D.-C. amplifier 336, and the delay line 334. The input terminal 322 is the input terminal of the buffer 330.

The output terminal of the buffer 330 and the reset terminal 326, as well as any additional reset terminals, are coupled to the gate 332 which feeds the D.-C. amplifier 336. The delay line 334 couples the negative output terminal 328 of the D.-C. amplifier 336 to the gate 332 so that normally the delay line 334 transmits a positive signal to the gate 332.

When the gate 332 receives positive signals coincidentally from the buffer 330, all of the reset terminals such as 326 and the delay line 334, the D.-C. amplifier 336 generates a positive potential of five volts at its positive output terminal 324 and a negative potential of ten volts at its negative output terminal 328. The D.-C. amplifier 336 transmits a negative potential of ten volts from its positive output terminal 324 and a positive potential of five volts from its negative output terminal 328 when a positive signal is not present at its input.

The positive output terminal 324 is coupled directly to the buffer 330 so that when a positive signal is generated at the positive output terminal 324, it is regenerative. The positive signal will be maintained at the positive output terminal 324 until the gate 332 is blocked by a negative signal received via one of the reset terminals such as 326, or by the negative signal which is fed from the negative output terminal 328 through the delay line 334.

Generally, the negative signal fed through the delay line 334 resets the delay flip flop 320 and, therefore, the delay in the delay line 334 controls the period of time for which the delay flip flop 320 may be set.

*Writing amplifier*

The symbol for a representative writing amplifier 338 is shown in Fig. 12. The writing amplifier 338 functions to cause current to flow through a magnetic head in one direction when a positive signal is received and to flow in the reverse direction when a negative signal is received. The writing amplifier 338 includes the input terminal 340 and the output terminal 342.

As shown in Fig. 12a, the circuitry of the writing amplifier 338 comprises the vacuum tube 344 having the anode 346 which is connected to the positive supply bus 250, the cathode 352 which is connected to the negative supply bus 70 via the resistor 354, the control grid 350 which is connected to the input terminal 340, and the screen grid 348 which is coupled to the positive supply bus 125. The output terminal 342 is connected to the cathode 352. In the information processing system, the output terminal 342 is coupled to one end of the coil winding of a magnetic head. The other end of the coil winding is ground (as shown in dotted outline).

If a negative signal representing a bit zero is applied to the input terminal 340, the vacuum tube 344 is nonconducting. Since the output terminal 342 is coupled to the coil winding, current will flow from ground through the coil winding and via the resistor 354 to the negative supply bus 70.

If a positive signal representing a bit one is applied to the input terminal 340, vacuum tube 344 will conduct, and the potential of the cathode 352 will swing positive causing current to flow from the cathode 352 via the coil winding to ground.

Stated otherwise, the current through the magnetic head will flow in one direction for a bit one, and in the reverse direction for a bit zero.

While only two embodiments of the invention have been described above, it is to be understood that many modifications and variations can be made therein accomplishing the foregoing objects and realizing all of the advantages without departing from the spirit of the invention.

What is claimed is:

1. An information processing system for processing information items each of which is composed of a predetermined number of bits of information comprising a storage medium having a multitude of storage zones each of which includes a plurality of storage positions respectively assignable to each bit of information in each information item, means associated with said storage medium for storing a predetermined portion of the bits of each information item in corresponding storage positions of a storage zone in accordance with a predetermined representation in which a bit one is represented by the presence of indicium in a storage position while a bit zero is represented by the absence of indicium in a storage position, means associated with said storage medium for storing the remaining portion of the bits of each information item in the remaining storage positions of the storage zone in accordance with a representation which is inverse to that of the predetermined representation, whereby the presence of indicium in any storage position of a storage zone indicates the presence of an information item in that storage zone while the absence of indicium in any storage position of a storage zone indicates the absence of an information item in that storage zone, means associated with said storage medium for reproducing the first mentioned portion of each stored information item according to the predetermined representation, and means associated with said storage medium for reproducing the remaining portion of each stored information item according to the inverse representation.

2. An information processing system for processing information items each of which is composed of a predetermined number of bits of information comprising a magnetic storage medium having a multitude of storage zones each of which includes a plurality of storage positions corresponding to the predetermined number of bits of information in each information item, a first storing means associated with said magnetic storage medium for storing a predetermined portion of the bits of each information item in corresponding storage positions of a storage zone in accordance with a predetermined representation in which a bit one is represented by the presence of a given magnetic polarization in a storage position while a bit zero is represented by the absence of the given magnetic polarization in a storage position, a second storing means associated with said magnetic storage medium for storing the remaining portion of the bits of each information item in the remaining storage positions of the storage zone in accordance with a representation which is inverse to that of the predetermined representation whereby the presence of a given magnetic polarization in any storage position of a storage zone indicates the presence of an information item in that storage zone while the absence of a given magnetic polarization in any storage position of a storage zone indicates the absence of an information item in that storage zone, a first reproducing means associated with said magnetic storage medium for reproducing the first mentioned portion of each stored information item according to the predetermined representation, and a second reproducing means associated with said magnetic storage medium for reproducing the remaining portion of each stored information item according to the inverse representation.

3. An information processing system for processing information items each of which is composed of a predetermined number of bits of information comprising a paper tape having a multitude of storage zones each of which includes a plurality of storage positions corresponding to the predetermined number of bits of information in each information item, a first storing means associated with said paper tape for storing a portion of the bits of each information item in corresponding storage positions of a storage zone in accordance with a predetermined representation in which a bit one is represented by the presence of a perforation in a storage position while a bit zero is represented by the absence of a perforation in a storage position, a second storing means associated with said paper tape for storing the remaining portion of the bits of each information item in the remaining storage positions of the storage zone in accordance with a representation which is inverse to that of the predetermined representation whereby the presence of a perforation in any storage position of a storage zone indicates the presence of an information item in that storage zone while the absence of a perforation in any storage position of a storage zone indicates the absence of an information item in that storage zone, a first reproducing means associated with said paper tape for reproducing the first mentioned portion of each stored information item according to the predetermined representation, and a second reproducing means associated with said paper tape for reproducing the remaining portion of each stored information item according to the inverse representation.

References Cited in the file of this patent

UNITED STATES PATENTS

| | | | |
|---|---|---|---|
| 1,564,421 | Kleinschmidt | Dec. 8, | 1925 |
| 2,512,038 | Potts | June 20, | 1950 |
| 2,616,965 | Hoeppner | Nov. 4, | 1952 |
| 2,658,139 | Abate | Nov. 3, | 1953 |
| 2,679,644 | Lippel et al. | May 25, | 1954 |
| 2,700,149 | Stone | Jan. 18, | 1955 |
| 2,701,095 | Stibitz | Feb. 1, | 1955 |
| 2,708,216 | Doerrfeld | May 10, | 1955 |
| 2,719,959 | Hobbs | Oct. 4, | 1955 |
| 2,751,432 | Breuer | June 19, | 1956 |
| 2,817,829 | Lubkin | Dec. 24, | 1957 |